United States Patent [19]

Anderson

[11] 4,047,445
[45] Sept. 13, 1977

[54] DEMAND DRIVEN CLUTCH

[75] Inventor: Conrad V. Anderson, Minneapolis, Minn.

[73] Assignee: Pako Corportion, Minneapolis, Minn.

[21] Appl. No.: 724,592

[22] Filed: Sept. 20, 1976

[51] Int. Cl.² .............................................. F16H 7/22
[52] U.S. Cl. .................................................. 74/230.4
[58] Field of Search ................ 74/230.4, 230.3, 230.01

[56] References Cited

U.S. PATENT DOCUMENTS 3,524,359  8/1970  Buchwald ....................... 74/230.4 X Primary Examiner—Leonard H. Gerin Attorney, Agent, or Firm—John W. Adams

[57] ABSTRACT

A demand driven clutch which constitutes an improvement over Jensen U.S. Pat. No. 3,369,765 and Treise U.S. Pat. No. 3,695,534 and which includes a pair of cooperating driving elements, one of which constitutes a driving collar fixed to the rotary drive shaft and the other constitutes a driving hub connected to said collar by stress distributing axially disposed connecting elements to maintain the circular configuration of the outer clutch surface of said hub for uniform engagement with the circular inner clutch surface of the spring spool pulley member.

6 Claims, 4 Drawing Figures

DEMAND DRIVEN CLUTCH

STATE OF PRIOR ART

A number of demand driven spring spool devices have been developed in the past such as the Jensen U.S. Pat. No. 3,369,765 and the Treise U.S. Pat. No. 3,695,534. The driving parts of the spool assembly are generally made from plastic material which is not subject to corrosion when used in connection with photographic processing equipment. The plastic materials conventionally used have been subject to distortion under the strain of the driving force normally transmitted from the shaft to the inner driving hub of the clutch assembly to produce eccentric portions thereof within the outer driven clutch portion of the spring spool.

BACKGROUND OF THE INVENTION

The present invention constitutes an improvement in the driving connection between the drive shaft and the inner driving hub element of the spring spool clutch mechanism and is specifically designed to maintain the outer circular shape of the inner driving hub by distributing the driving force transmitted thereto from said drive shaft to prevent distortion of the hub and producing eccentric portions thereof with the circular spring spool driven pulley element.

SUMMARY OF THE INVENTION

This invention is an improvement in the driving connection between the central drive shaft and the driving hub of the clutch which has a friction drive clutch connection with the belt engaging spring spool element whereby the driving connection between the shaft and the hub is specifically designed to distribute the driving force around substantial portions of the periphery thereof so that the concentricity of the hub relative to the drive shaft can be accurately maintained. This is accomplished by providing a driving collar which is fixed to the shaft for rotation therewith and which has a stress distributing connection with the driving hub of the clutch assembly such as a plurality of axially extending circumferientally spaced connecting pins extending between said collar and said hub and specifically constructed and arranged to prevent distortion of the hub under the stress of transmitting the driving force from the shaft and collar to the outer spring spool pulley element.

The following is a description of the specific embodiment of this invention illustrated in the accompanying drawings wherein like reference characters refer to similar parts throughout the several views and in which.

SPECIFIC DISCLOSURE

Figure 1:
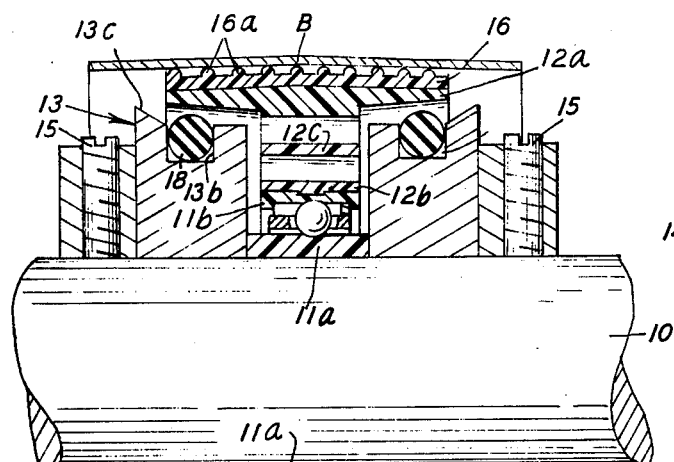
FIG. 1 is a central vertical sectional view of a clutch embodying this invention shown in idling position.
Figure 4:
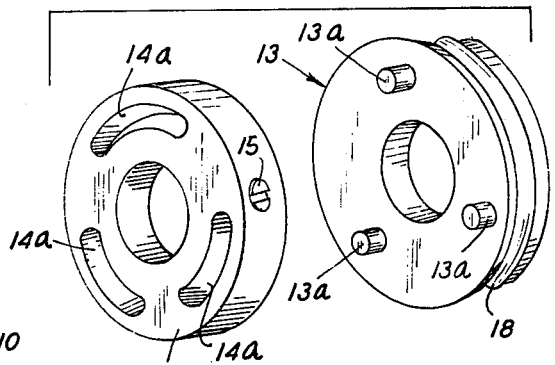
FIG. 4 is an exploded perspective view, drawn to reduced scale, showing the driving coupling between the collar and hub elements.

As shown in the drawings, a continuously rotating drive shaft 10 is provided on which a suitable ball bearing assembly 11 is mounted. The inner sleeve or race 11a of the ball bearing assembly has a close fit on the shaft 10 and the outer race or sleeve 11b is freely rotatable therearound. A spring spool unit 12 is mounted for free rotation on said ball bearing assembly 11 and has an outer rim or flange element 12a and an inner sleeve 12b which, in the form shown, has a snap fit connection with the outer race 11b of the bearing 11. The two spring spool elements 12a and 12b are connected together by a plurality of circumferentially spaced resilient vane elements 12c which are designed to normally maintain a predetermined spaced relation between elements 12a and 12b but permit the radial spacing between said elements to be reduced in response to increased tension in a web B trained about the outer rim 12a.

Figure 2:
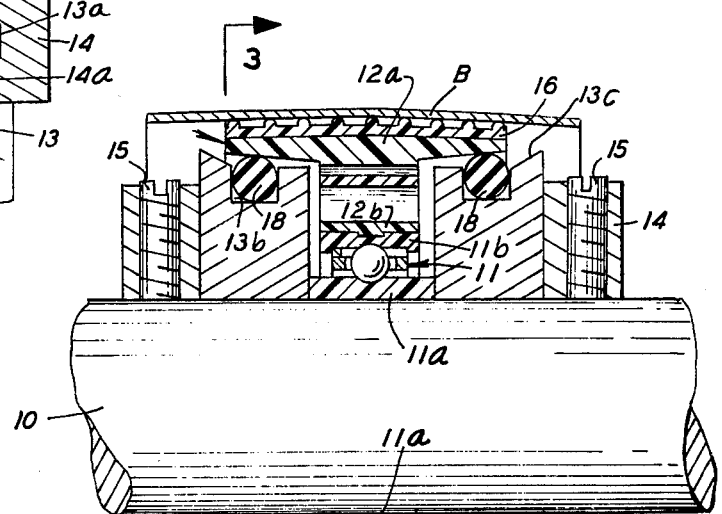
FIG. 2 is a similar view showing the clutch in driving position.
Figure 3:
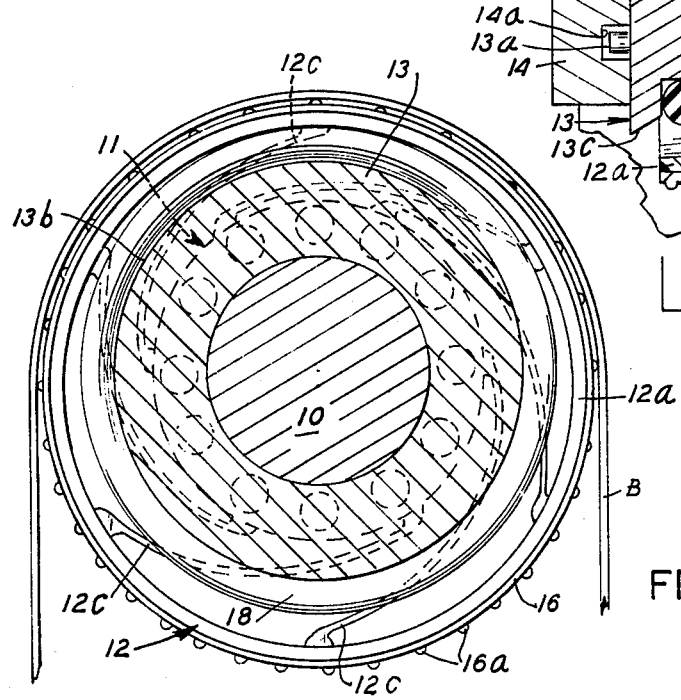
FIG. 3 is a transverse sectional view taken substantially along the line 3—3 of FIG. 2.

A driving clutch element or hub 13 is mounted on the shaft 10 in right, close-fitting relation thereto and is drivingly connected thereby by means of a collar 14 disposed in adjacent side-by-side relation thereto. A plurality of axially extending pins 13a are fixed to the side of hub 13 adjacent said hub and are respectively received in slots 14a which are wider than the diameter of the pins 13a to form the drive coupling between said collar and hub, as best shown in FIGS. 2 and 3. The collar is fixed to the shaft 10 as by a set screw 15. The inner sleeve or race 11a of the bearing 11 is slightly wider than the outer sleeve or race 11b thereof and the central spring spool elements, to space the hub 13 axially outwardly from said spring spool elements and permit normal radial movement between the outer element 12a and inner element 12b and also permit free rotation of the spring spool unit 12 on the shaft 10.

A groove 13b is provided around the hub 13 to receive a member such as an O-ring 18 which provides a high friction, smoothly engageable clutching surface between said hub element 13 and the inner surface of rim 12a. An inwardly beveled drip edge 13a is provided at the outer edge of the hub element 13 to carry off the liquid which might otherwise tend to accumulate in the groove 13a, or on inside the spring spool 12.

A cushioning tire element 16 is fixed to the outer surface of the rim 12a and has a plurality of cushioning hubs 16a formed thereon and provides a high friction coupling with the web B trained therearound. This assists tracking and gives a soft touch to the engaging surface.

A similar hub and collar assembly 13 and 14 are provided on the other side of the spring spool unit 12 and this prevents the entire assembly from shifting axially on the shaft 10 and to provide additional driving clutch area with inner surface of the rim 12a as shown.

OPERATION

When the resistance to rotation of the entire drive system causes the tension in the web B to increase, the web produces an external radially directed force inwardly on the outer rim 12a causing the resilient vanes 12c to yield and produce frictional driving engagement between the O-rings 18 of the rotating hubs 13 and the inner surfaces of rim 12a respectively surrounding the same. By providing the multiple pin driving connection around to prevent distortion of the circular outer periphery of the hub elements 13. This maintains a uniform gap between the rim and hub elements and permits a minimum gap to be maintained which minimizes the stress on the resilient vane elements 12c of the spring spool unit 12. This collar and hub coupling assembly also permits the use of different materials so that the hub element can be molded from a dimensionally stable but not necessarily strong material such as, but not limited to, mineral filled polypropylene, while the collar element can be molded from a strong material which need not be dimensionally stable such as, but not limited to, fiber glass filled nylon. The coupling pins 13a can be designed as safety shear pins preventing damage to the parts under excessive load conditions, thus providing a safety feature not possible with the other spring spool designs presently in use.

It will be seen that this invention provides a spring spool type demand driven clutch arrangement which is specifically designed to maintain the circular concentric relationship of the driving hubs 13 within the driven rim element 12a of the spool unit 12 by removing the distortion produced by the driving force of the shaft 10 on the inner clutch element. The clearance between the pins 13a and slots 14a is provided so that radial distortion from the set screw 15 does not cause the pins 13a to bind in the slots 14a, as shown in FIGS. 2 and 3. The provision of the beveled drip edge 13c around the outer edge of said hub carries off substantial amounts of liquid from the moving parts of the assembly.

It will, of course, be understood that various changes may be made in the form, details, arrangement and proportions of the parts without departing from the scope of this invention, which generally stated is set forth in the appended claims.

What is claimed is:

1. A demand driven clutch assembly comprising:
   a pulley member including an outer rim, an inner sleeve positioned in spaced relation within the outer sleeve and a plurality of yieldable resilient vanes which normally maintain said rim and sleeve in concentric relation but are yieldable to external force to permit said rim to shift radially inwardly, said inner sleeve being adapted to be journaled for free rotation on a rotary drive shaft, and
   said outer rim extending axially outwardly beyond said inner sleeve to provide an inner friction clutch driving surface,
   a pair of driving members including:
   a driving collar adapted to be fixed to the drive shaft in axially spaced relation to said inner sleeve,
   a driving hub clutch element interposed between said collar and said inner sleeve and having a central axial opening to receive shaft, and
   a plurality of connecting elements extending between said collar and said hub in parallel relation to the axis of said central opening to provide a driving connection between said hub and said collar,
   the outer circumferential surface of said hub providing a friction driving clutch surface for driving engagement within the inner clutch surface of said rim when said rim is shifted radially inwardly by an external force applied to the outside thereof.

2. The structure set forth in claim 1 and one of said driving members having a plurality of circumferentially spaced openings therein, and
   said connecting elements comprising a plurality of pins mounted on the other driving member and respectively received in said openings when said driving members are mounted on the drive shaft in substantially side by side operating position.

3. The structure set forth in claim 2 and the radial width of said opening being slightly greater than the diameter of said pins to produce a lost motion fit therebetween and substantially eliminate the transfer of radially distorting stresses from one driving element to the other.

4. The structure set forth in claim 1 and a high friction element interposed between said hub and said rim for insuring smooth clutching engagement therebetween.

5. The structure set forth in claim 4 and said driving element comprising an O-ring mounted around said hub in opposed relation to the outwardly extending driving surface of said rim for driving engagement therewith when said rim is shifted radially inwardly by an external force applied thereto.

6. The structure set forth in claim 1 and said collar being of smaller diameter than the outer portion of said hub element, said outer hub portion being beveled outwardly to provide a drip edge for removing excess liquid therefrom.

* * * * *